US012145376B2

(12) United States Patent
Hisanaga

(10) Patent No.: US 12,145,376 B2
(45) Date of Patent: Nov. 19, 2024

(54) LIQUID EJECTION APPARATUS

(71) Applicant: CANON KABUSHIKI KAISHA, Tokyo (JP)

(72) Inventor: Akane Hisanaga, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 17/952,014

(22) Filed: Sep. 23, 2022

(65) Prior Publication Data

US 2023/0107578 A1 Apr. 6, 2023

(30) Foreign Application Priority Data

Oct. 1, 2021 (JP) ................................ 2021-162737

(51) Int. Cl.
*B41J 2/175* (2006.01)

(52) U.S. Cl.
CPC .. *B41J 2/17566* (2013.01); *B41J 2002/17576* (2013.01)

(58) Field of Classification Search
CPC ............................................. B41J 2002/17576
See application file for complete search history.

(56) References Cited

U.S. PATENT DOCUMENTS

2017/0151803 A1* 6/2017 Yoshii .................. B41J 2/17566
2018/0215166 A1 8/2018 Tanabe et al.
2019/0030910 A1* 1/2019 Tanabe ................. B41J 2/17546
2021/0300056 A1 9/2021 Hisanaga ................ B41J 2/175

FOREIGN PATENT DOCUMENTS

JP 2007268793 A * 10/2007 .......... B41J 2/17513
JP 2018-122516 8/2018

* cited by examiner

*Primary Examiner* — Shelby L Fidler
(74) *Attorney, Agent, or Firm* — Venable LLP

(57) ABSTRACT

Provided is a liquid-ejection-apparatus including: a retention-chamber to retain liquid; a turning-member located in the retention-chamber and turns about a shaft-portion according to a height of a liquid-surface of the liquid in the retention-chamber; and a sensor-unit to detect turning of the turning-member. The turning-member includes a float-portion having a lower specific gravity than the liquid in the retention-chamber and a detected portion located above the float-portion and detected by the sensor-unit. A liquid-holding-portion is formed, the liquid-holding-portion extending to the shaft-portion from at least one of a side-surface-portion and a bottom-surface-portion of the float-portion and which can hold the liquid in the retention-chamber. Where the liquid-surface of the liquid in the retention-chamber is at or below a predetermined height, the liquid-holding-portion touches the liquid-surface of the liquid in the retention-chamber to maintain the height of the liquid-surface near the shaft-portion to a height where the shaft-portion is located.

12 Claims, 13 Drawing Sheets

LIQUID EJECTION APPARATUS

BACKGROUND

Field of the Disclosure

The present disclosure relates to a liquid ejection apparatus.

Description of the Related Art

Japanese Patent Laid-Open No. 2018-122516 describes a technique of using a turning member to detect the amount of liquid remaining in a retention chamber. A liquid ejection apparatus according to Japanese Patent Laid-Open No. 2018-122516 forcibly stops ink ejection once the height of the liquid surface in the retention chamber becomes lower than a shaft for turning the turning member.

This technique allows the shaft to remain submerged in ink until ink refill, thereby reducing the possibility of the turning member becoming immobilized due to ink solidification.

However, the liquid ejection apparatus according to Japanese Patent Laid-Open No. 2018-122516 cannot continue liquid ejection once the height of the liquid surface becomes lower than the shaft of the turning member.

Thus, the present disclosure has an object to continue liquid ejection while inhibiting liquid solidification even in a case where a small amount of liquid remains.

SUMMARY

A liquid ejection apparatus of the present disclosure includes: a retention chamber configured to retain liquid; turning member located in the retention chamber and configured to turn about a shaft portion in accordance with a height of a liquid surface of the liquid retained in the retention chamber; and a sensor unit configured to detect turning of the turning member. The turning member includes a float portion having a lower specific gravity than the liquid retained in the retention chamber and a detected portion located above the float portion and detected by the sensor unit, and a liquid holding portion formed to extend to the shaft portion from at least one of a side surface portion and a bottom surface portion of the float portion and configured to be capable of holding the liquid retained in the retention chamber. In a case where the liquid surface of the liquid retained in the retention chamber is at or below a predetermined height, the liquid holding portion touches the liquid surface of the liquid retained in the retention chamber to maintain the height of the liquid surface near the shaft portion to a height where the shaft portion is located.

Further features of the present disclosure will become apparent from the following description of exemplary embodiments with reference to the attached drawings.

DESCRIPTION OF THE EMBODIMENTS

Figure 1A:
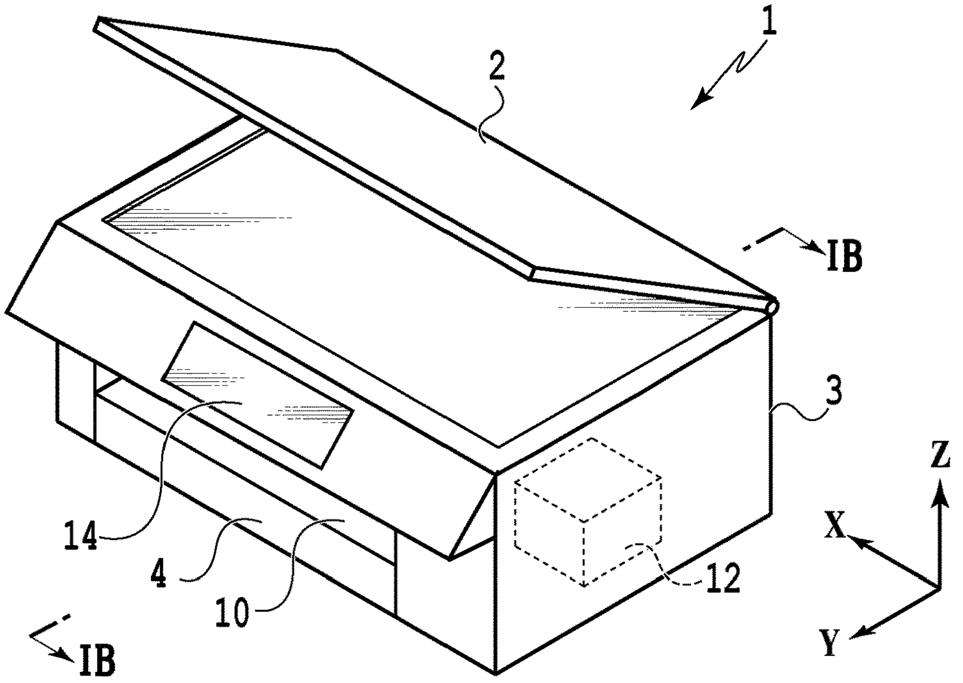
FIGS. 1A and 1B are schematic diagrams of a printing apparatus.

Embodiments of a technique according to the present disclosure are described below with reference to the drawings. Throughout the drawings, parts having the same function may be denoted by the same reference numeral to omit descriptions. The embodiments described below are merely examples of the technique according to the present disclosure and can be appropriately modified in their configurations and methods without changing the gist of the technique according to the present disclosure.

First Embodiment

<<Liquid Ejection Apparatus>>

Figure 1B:
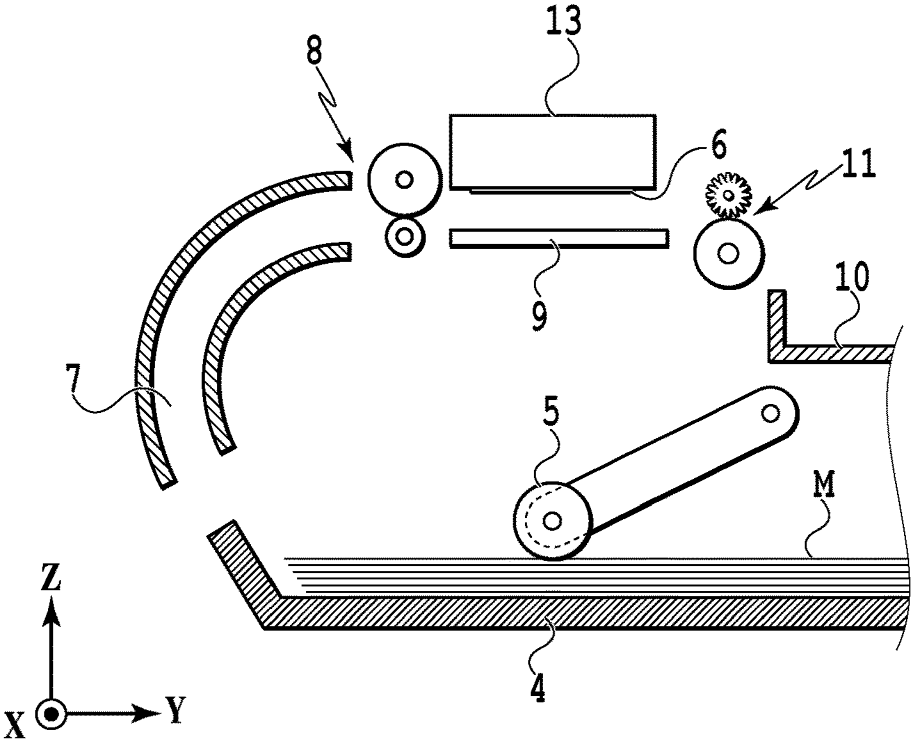

First, a liquid ejection apparatus according to the present embodiment is described with reference to FIG. 1. Note that a printing apparatus 1 that performs printing by ejecting ink to a printing medium M is described herein as an example of the liquid ejection apparatus. FIGS. 1A and 1B are schematic diagrams of the printing apparatus 1 according to the present embodiment, FIG. 1A being a perspective view, FIG. 1B being a diagram illustrating the configuration of a printing unit 3. Note that the printing apparatus 1 in FIGS. 1A and 1B is an example of the printing apparatus 1 to which the present embodiment can be applied, and the printing apparatus 1 to which the present embodiment can be applied is not limited to the printing apparatus 1. The printing apparatus 1 shown in FIGS. 1A and 1B is what is called a multifunction machine including a reading unit 2 capable of reading an original set on a document table and the printing unit 3 that performs printing on the printing medium M based on, e.g., information read by the reading unit 2 or information inputted from an external apparatus. The reading unit 2 is located at an upper part of the printing apparatus 1. The printing unit 3 is located at a lower part of the printing apparatus 1. The printing unit 3 includes a housing tray 4 for housing the printing medium M, a feed roller 5 that feeds the printing medium M housed in the housing tray 4, and a guide part 7 that guides the fed printing medium M to a location where the printing medium M is printed by a print head 6 (to be described later). The printing unit 3 also includes conveyance rollers 8 that convey the printing medium M fed thereto through the guide part 7, a platen 9 that supports the printing medium M conveyed by the conveyance rollers 8, and the print head 6 that ejects ink to the printing medium M supported by the platen 9. The printing unit 3 further includes discharge rollers 11 that discharge the printed printing medium M to a discharge tray 10 and an ink retention unit 12 that retains ink to be supplied to the print head 6 via a tube (not shown). The print head 6 may be capable of ejecting a plurality of colors of ink or a single color of ink. The print head 6 may also be capable of ejecting a treatment liquid for giving a predetermined effect to a printed image. In a case of ejecting a plurality of types of ink (including a treatment liquid), a plurality of the ink retention units 12 are provided, each retaining a different type of ink. The print head 6 is mounted to a carriage 13. The carriage 13 is configured to be capable of reciprocating in an X-direction. The printing medium M housed in the housing tray 4 is conveyed by the feed roller 5 in a −Y-direction (leftward in FIG. 1B), caused to make a U-turn by the guide part 7, and is conveyed by the conveyance rollers 8 in a +Y-direction (rightward in FIG. 1B). In the printing apparatus 1, a printing operation is performed in which the print head 6, while moving in the X-direction via the carriage 13, ejects ink to the printing medium M supported on the platen 9, thereby printing one scan worth of data on the printing medium M. Next, a conveyance operation is performed in which the printing medium M is conveyed by a predetermined amount in the +Y-direction so that an unprinted region of the printing medium M may be located at a position facing the print head 6. After that, the print operation is performed again. In this way, the printing apparatus 1 prints a predetermined image on the printing medium M by repeating the printing operation and the conveyance operation. Also, a display unit 14 displays various kinds of information related to the printing apparatus 1. The ink retention unit 12 includes an ink housing body 30 (see FIGS. 2A and 2B) housing ink and a tank 20 that retains ink housed in the ink housing body 30.

<<Tank 20>>

Figure 2A:
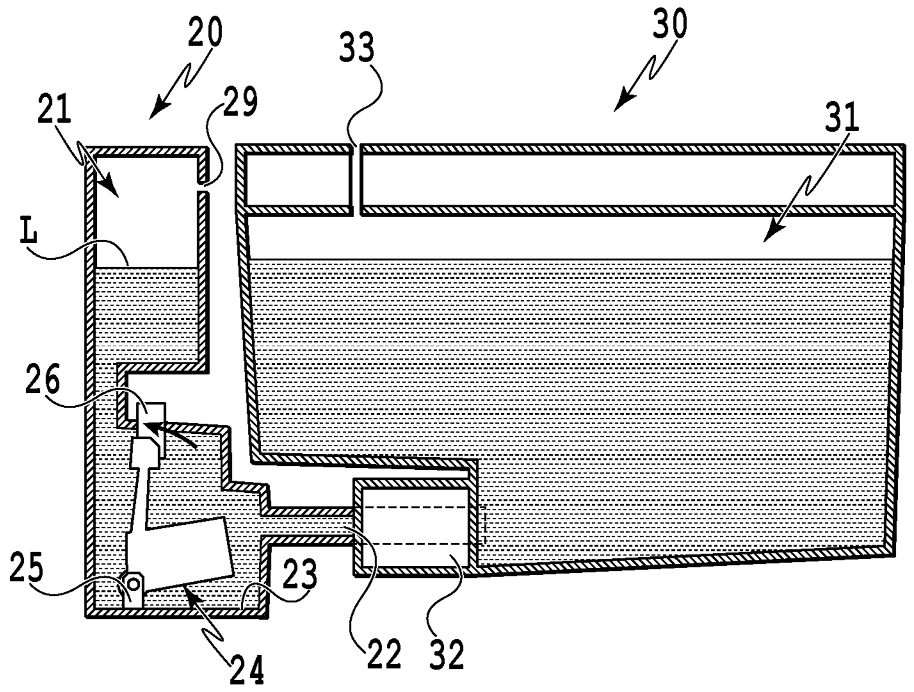
FIGS. 2A and 2B are diagrams illustrating supply of ink to a tank.
Figure 2B:
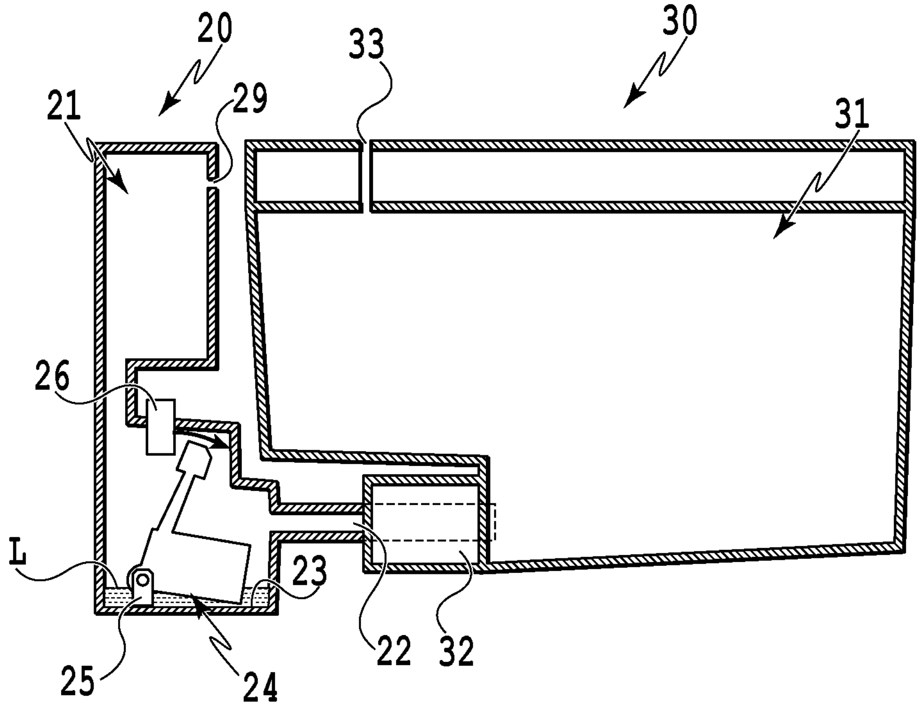

FIGS. 2A and 2B are diagrams illustrating supply of ink to the tank 20. FIG. 2A shows how a turning member 24 operates in a case where the ink housing body 30 is attached to the tank 20 and the tank 20 has been refilled with ink. FIG. 2B shows how the turning member 24 operates in a case where the amount of ink in the tank 20 decreases due to consumption of ink. The ink retention unit 12 described above is provided for each type of ink to be ejected from the print head 6 described above. Note that the ink retention unit 12 has the same configuration irrespective of the type of the ink. Via the tube, the ink retention unit 12 supplies the print head 6 with ink temporarily retained in a retention chamber 21 of the tank 20. Once the ink is supplied from the retention chamber 21 to the print head 6 and is decreased in amount in the retention chamber 21, ink is supplied to the retention chamber 21 from the connected ink housing body 30. The ink housing body 30 includes a liquid storage chamber 31 and a lid part. Ink is stored inside the liquid storage chamber 31. Also, a supply part 32 is provided at a bottom portion of the liquid storage chamber 31, the supply part 32 being connected to a connection member 22 (to be described later) of the tank 20 and capable of supplying ink stored in the liquid storage chamber 31 to the retention chamber 21. In other words, in the present embodiment, the ink housing body 30 is configured to be attachable to and detachable from the tank 20 via the supply part 32. The supply part 32 includes a check valve such as a valve spring structure. In the lid part, a first atmosphere communication port 33 is formed to allow the inside and the outside of the ink housing body 30 to communicate with each other.

The tank 20 includes the connection member 22 to be connected to the ink housing body 30 via the supply part 32. The connection member 22 is tubular in shape having an ink flow channel formed therein, and once connected to the ink housing body 30 via the supply part 32, the connection member 22 allows ink flowing thereinto via the supply part 32 to be led into the retention chamber 21. The turning member 24 is provided at a bottom surface 23 inside the retention chamber 21. At the bottom surface 23, the turning member 24 is turnably supported by support members 25. Thus, once liquid is supplied to the retention chamber 21, the turning member 24 becomes submerged in the liquid. Inside the retention chamber 21, a sensor unit 26 that can detect turning of the turning member 24 is provided above the turning member 24. In the retention chamber 21, a second atmosphere communication port 29 is formed at a position not reached by the liquid surface of ink retained, to allow the inside and the outside of the retention chamber 21 to communicate with each other. The turning member 24 is described below using FIGS. 3, 4A, and 4B.

<<Turning Member 24>>

Figure 3:
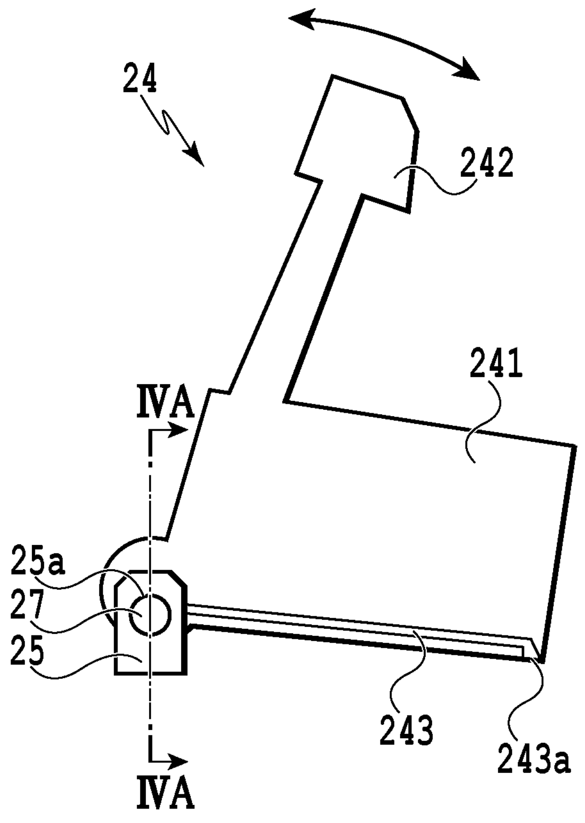
FIG. 3 is a schematic side view of a turning member.

FIG. 3 is a schematic side view of the turning member 24. The turning member 24 includes a float portion 241 extending in the Y-direction, an arm portion extending from the float portion 241 upward (substantially a Z-direction), and a detected portion 242 located at a tip end of the arm portion. The float portion 241 is formed of a material having a lower specific gravity than the ink stored in the ink housing body 30. Also, the float portion 241 has the shape of a quadrangular prism extending in the Y-direction. The shape of a quadrangular prism means the shape of a substantially quadrangular prism. An insertion hole 28 (FIGS. 4A and 4B) is formed in the float portion 241 at its one side in the Y-direction, i.e., a lower end portion closer to an end surface (a surface located most leftward in FIG. 3) than the center of gravity of the float portion 241 is. A hole portion 25*a* is formed in an upper portion of each support member 25 to insert a shaft 27. The shaft 27 is inserted through the insertion hole 28 in the float portion 241 and the hole portions 25*a* in the support members 25. Thus, the float portion 241 is turnably supported by the shaft 27 extending in the X-direction in the support members 25. The float portion 241 can therefore turn about the shaft 27 with a large stroke. Note that the turning member 24 may be supported by a member other than the support members 25 as long as the turning member 24 can turn. Hereinafter, a space including a space between the shaft 27 and the support members 25 supporting the shaft 27 is called a "shaft portion" where appropriate. For example, the "shaft portion" includes an interstice between the shaft 27 and the insertion hole 28.

The detected portion 242 is located above the float portion 241 with the arm portion in between. Thus, the detected portion 242 is configured to be movable as the float portion 241 turns. The detected portion 242 is formed of a material that can be detected by the sensor unit 26. Note that the sensor unit 26 in the present embodiment is, as will be described later, an optical sensor unit including a light emitter (not shown) and a light receiver (not shown). Thus, the detected portion 242 is formed of a material that shields or attenuates light from the light emitter.

Also, a liquid holding portion 243 capable of holding the liquid retained in the retention chamber 21 by use of capillary force extends at a side surface portion of the float portion 241. Note that the liquid holding portion 243 may extend at a bottom surface portion of the float portion 241. Once ink is consumed to the point where the height L of the liquid surface (see FIG. 2B) in the retention chamber 21 described above is lower than the shaft 27 and the float portion 241 tilts rightward in FIG. 2B, the liquid holding portion 243 touches the liquid surface. Note that an end portion of the liquid holding portion 243 closer to the shaft 27 is called a "first end," and an end portion of the liquid holding portion 243 far from the shaft 27 is called a "second end." The liquid holding portion 243 is formed continuously from the bottom surface portion of the float portion 241 to the inner circumferential surface of the insertion hole 28. Once the second end side of the liquid holding portion 243 comes into contact with the liquid surface, capillary force is generated to suck up the liquid to the first end side of the liquid holding portion 243, so that the height L of the liquid surface near the shaft portion can be maintained at a height where the shaft 27 is located. The shape of the liquid holding portion 243 needed to generate the capillary force is at least one of a projecting type and a recessed type. In the example shown in the present embodiment, a minute groove (i.e., a minute recessed portion) is formed as the liquid holding portion 243 in the side surface of the float portion 241. The second end of the liquid holding portion 243 is in contact with the bottom surface portion of the float portion 241.

Thus, even in a case where ink inside the retention chamber 21 is consumed to the point where the lower end portion of the float portion 241 contacts the bottom surface 23 of the retention chamber 21, ink pooling on the bottom surface 23 can be sucked up by the second end of the liquid holding portion 243 contacting the bottom surface 23 as well. Further, as shown, an expanded diameter portion **243*a* is preferably formed at the second end side of the liquid holding portion 243, the expanded diameter portion 243*a* being formed to have a larger width than the first end side of the liquid holding portion 243. This can increase the ink sucking force (i.e., capillary force) even more. It goes without saying that the shape of the liquid holding portion 243 may be such that the diameter gradually increases from the first end side of the liquid holding portion 243 to the second end side of the liquid holding portion 243. A configuration around the shaft 27 is described below using FIGS. 4A and 4**B.

Figure 4A:
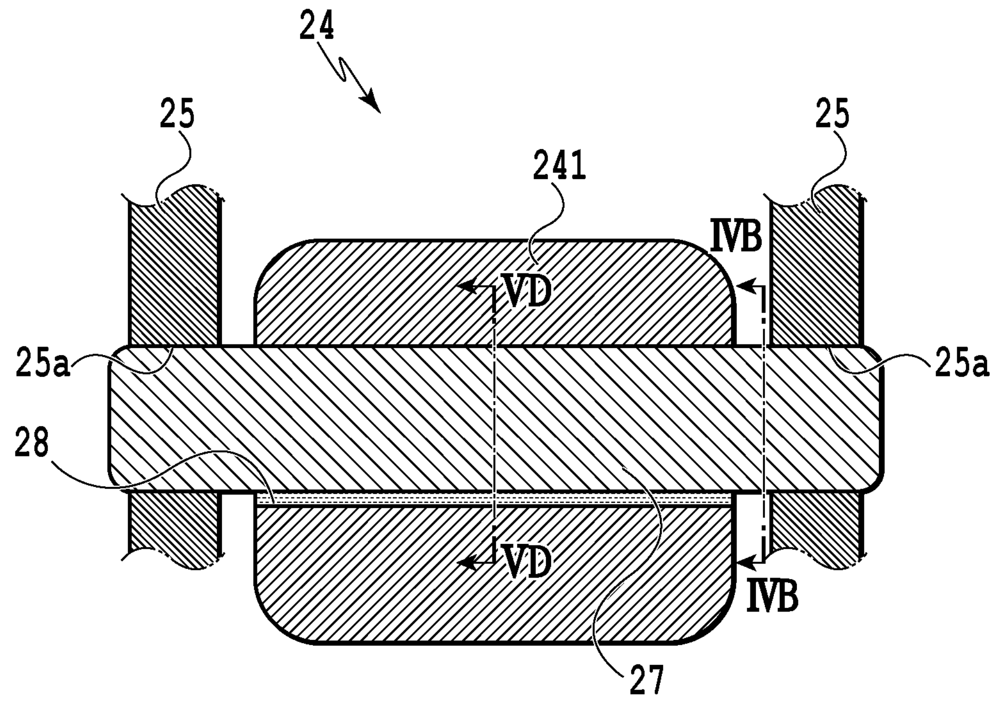
FIGS. 4A and 4B are schematic enlarged views of the vicinity of a shaft for the turning member.
Figure 4B:
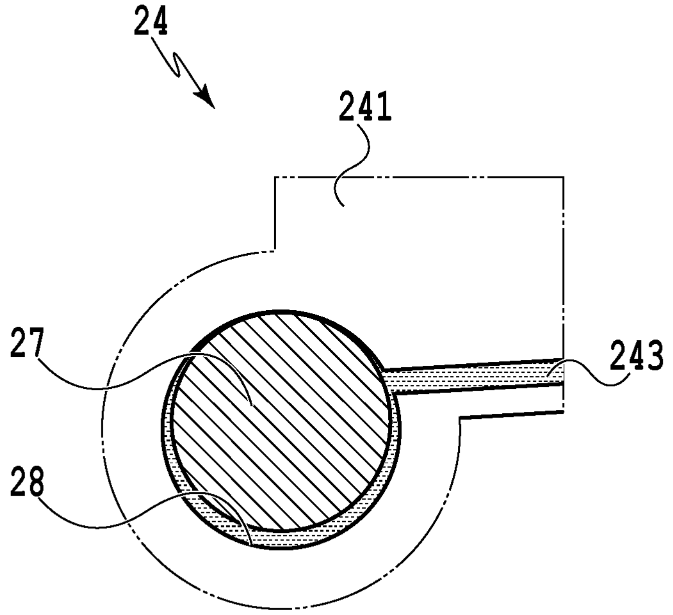

FIGS. 4A and 4B are schematic enlarged view of the vicinity of the shaft 27 of the turning member 24. FIG. 4A shows a sectional view taken along the line IVa-IVa in FIG. 3, and FIG. 4B shows a sectional view taken along the line IVb-IVb in FIG. 4A. As shown in FIG. 4A, the shaft 27 is supported by the hole portions **25*a* in the support members 25. A small interstice (play) exists between the shaft 27 and the insertion hole 28. Ink that has entered this interstice serves a lubricant, making it easier for the float portion 241 to turn smoothly. Also, even in a case where at least one of the shaft 27 and the insertion hole 28 has manufacturing variability, the ink in the interstice makes it easier for the float portion 241 to turn smoothly. However, in a case where the ink pooling in the interstice solidifies, the float portion 241 can no longer turn smoothly. For example, depending on a user's usage situation, even after a notification is given to prompt replacement of the ink housing body 30, the ink housing body 30 may not be replaced with a new one, and the tank 20 may be left with the height L of the liquid surface of the ink staying lower than the shaft 27. In a case where the tank 20 is left with the height L of the liquid surface of the ink (see FIGS. 2A and 2B) staying lower than the shaft 27, part of the shaft 27 is exposed to the atmosphere. In a case where this state continues for a long time, at least one of the ink around the shaft 27 and the ink around the end portion of the float portion 241 on the second end side thickens and eventually solidifies. This hinders the turning of the turning member 24 and therefore may make it impossible to correctly detect whether the height L of the liquid surface of the ink is at or above a predetermined position, i.e., whether the amount of ink remaining in the retention chamber 21 is less than a predetermined amount. For this reason, the above-described liquid holding portion 243 is formed in order to supply ink to the interstice and maintain smooth turning of the float portion 241 even in a case where the height L of the liquid surface of the ink becomes lower than the shaft 27. As shown in FIG. 4B, a minute recessed portion (groove) is provided at a side surface of the float portion 241 as an example of the liquid holding portion 243. The first end of the liquid holding portion 243 is in contact with the inner circumferential surface of the insertion hole 28. Once the ink in the retention chamber 21 is consumed and the position of the height L of the liquid surface lowers, exposing the first end of the liquid holding portion 243 to the atmosphere, the ink is sucked up by capillary force and supplied to the interstice. Thus, the height L of the liquid surface is maintained at the position of the shaft 27**. Solidification of ink pooing in the interstice can thus be inhibited.

<<Detection of a Remaining Amount of Ink>>

Referring back to FIGS. 2A and 2B, the description of the printing apparatus 1 is continued. The sensor unit 26 is detection means that optically detects the position of the height L of the liquid surface of ink retained in the retention chamber 21 by detecting turning of the turning member 24. The sensor unit 26 includes a light emitter and a light receiver. The light emitter and the light receiver are disposed to face each other with a gap therebetween in the X-direction in FIGS. 2A and 2B. Note that in the event where the turning member 24 turns, the detected portion 242 passes through between the light emitter and the light receiver. Then, the sensor unit 26 outputs a different detection signal depending on reception of light outputted from the light emitter by the light receiver. Specifically, for example, in a case where light outputted from the light emitter cannot be received by the light receiver, i.e., the intensity of light received is less than a predetermined intensity, the sensor unit 26 outputs a low-level signal indicating a signal whose signal level is below a threshold level. The low-level signal outputted is received by a control unit (not shown) mounted on a main board (not shown). Upon receipt of a low-level signal, the control unit detects that the height of the liquid surface of the ink is at or above the predetermined position. By contrast, in a case where light outputted from the light emitter can be received by the light receiver, i.e., the intensity of light received is equal to or above the predetermined intensity, the sensor unit 26 outputs a high-level signal indicating a signal whose signal level is equal to or above the threshold level. The high-level signal outputted is received by the control unit, and the control unit detects that the height of the liquid surface of the ink is below the predetermined position. Once the ink housing body 30 is connected, via the supply part 32, to the connection member 22 of the tank 20 having no ink retained therein, ink inside the ink housing body 30 flows into the retention chamber 21 via the supply part 32 and the connection member 22. Once there is a certain amount of ink retained in the retention chamber 21, the force of gravity surpasses the buoyancy force acting on the float portion 241 having a lower specific gravity than ink, and the turning member 24 (the float portion 241) turns leftward in FIGS. 2A and 2B. The turning of the turning member 24 leftward in FIGS. 2A and 2B causes the detected portion 242 to move in the same direction as well. Then, once the height L of the liquid surface of the ink in the retention chamber 21 is at or above the predetermined position due to more ink flowing in, the detected portion 242 moves leftward in FIGS. 2A and 2B and comes to be located between the light emitter and the light receiver of the sensor unit 26. The height L of the liquid surface of the ink in the retention chamber 21 being at or above the predetermined position is, in other words, a predetermined amount or more of ink being retained in the retention chamber 21. Note that while the height L of the liquid surface of ink is at or above the predetermined position, the detected portion 242 stays between the light emitter and the light receiver (see FIG. 2A). In this way, in a case where the height L of the liquid surface of ink is at or above the predetermined position, in the detected portion 242, light outputted from the light emitter is not received by the light receiver (or reaches the light receiver after being attenuated), and thus, the sensor unit 26 outputs a low-level signal to the control unit. The control unit thus detects that the height L of the liquid surface of the ink is at or above the predetermined position. By contrast, in a case where ink in the retention chamber 21 and the ink housing body 30 is decreased by being supplied from the retention chamber 21 to the print head 6 (see FIG. 1B), the liquid surface of the ink in the retention chamber 21 lowers. Once the amount of ink in the retention chamber 21 decreases and the amount of ink in the retention chamber 21 becomes less than a certain amount, the force of gravity surpasses the force of buoyancy acting on the float portion 241. As a result, the turning member 24 (the float portion 241) turns rightward in FIGS. 2A and 2B (see FIG. 2B). The turning of the turning member 24 rightward in FIGS. 2A and 2B causes the detected portion 242 to move in the same direction as well. Then, once the height L of the liquid surface of the ink in the retention chamber 21 becomes lower than the predetermined position due to supply of more ink to the print head 6, the detected portion 242 moves rightward in FIGS. 2A and 2B and moves to a position retreated from the position between the light emitter and the light receiver of the sensor unit 26. Note that while the height L of the liquid surface of ink is below the predetermined position, the detected portion 242 is at a position retreated from the position between the light emitter and the light receiver (see FIG. 2B). In this way, in a case where the height L of the liquid surface of ink is below the predetermined position, in the detected portion 242, light outputted from the light emitter can be received by the light receiver (or reaches the light receiver without being attenuated), and thus, the sensor unit 26 outputs a high-level signal to the control unit. The control unit thereby detects that the height L of the liquid surface of the ink is below the predetermined position. As soon as it is detected that the height L of the liquid surface of the ink becomes lower than the predetermined position, the printing apparatus 1 gives a notification prompting replacement of the ink housing body 30 to a user on, for example, the display unit 14 (see FIG. 1A) provided to the printing apparatus 1.

Conclusion

The liquid ejection apparatus according to the present disclosure can continue liquid ejection while inhibiting solidification of the liquid even in a case where a small amount of liquid remains. Further, the liquid ejection apparatus according to the present disclosure can continue detection of a remaining amount of liquid while inhibiting solidification of the liquid even after the height L of the liquid surface in the retention chamber becomes lower than the shaft 27 for turning the turning member 24. As a result, the control unit of the printing apparatus 1 can inform a user at an appropriate timing that the ink housing body 30 needs to be replaced. Thus, a user can check the notification displayed on the display unit 14 and replace the ink housing body 30 at an appropriate timing.

Second Embodiment

Next, a liquid ejection apparatus of a second embodiment is described using FIGS. 5A to 5D. Note that, like the first embodiment, the printing apparatus 1 that performs printing by ejecting ink to the printing medium M is described as an example in the following description. Also, a configuration which is the same as or equivalent to that in the printing apparatus 1 of the first embodiment is denoted by the same reference numeral as that used in the first embodiment to omit its detail description where appropriate.

Figure 5A:
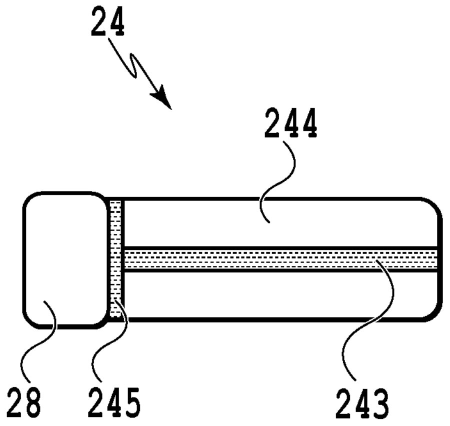
FIGS. 5A to 5D are schematic views of the turning member having a liquid holding portion formed at the bottom surface of a float portion.

The present embodiment has an object to provide a liquid ejection apparatus that can inhibit liquid solidification more. FIGS. 5A to 5D are schematic diagrams of the float portion 241 according to the present embodiment. FIG. 5A is a schematic diagram of a bottom surface 244 of the float portion 241 according to the present embodiment. As shown in FIG. 5A, a liquid introduction hole 245 is formed in the bottom surface 244 of the float portion 241 according to the present embodiment, the liquid introduction hole 245 communicating with the interstice between the shaft 27 and the insertion hole 28 from the bottom surface 244.

This configuration allows ink to be sucked up also from the bottom surface 244 of the float portion 241 and supplied to the shaft portion. This can inhibit liquid solidification.

Figure 5B:
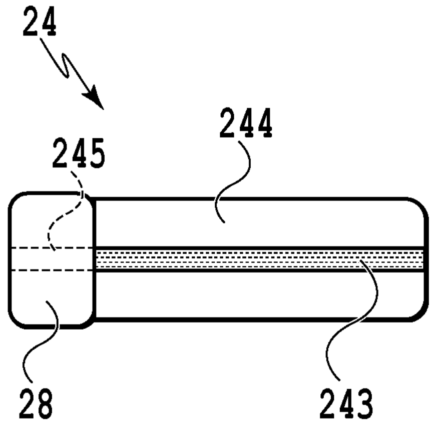

FIG. 5B is a diagram showing a modification of the liquid introduction hole 245 according to the present embodiment. As shown in FIG. 5B, the liquid introduction hole 245 may be formed inside the float portion 241, penetrating through the insertion hole 28. FIG. 5D is a schematic sectional view showing the turning member 24 according to FIG. 5B taken along the line Vd-Vd in FIG. 4.

This configuration allows ink taken in from the outside of the float portion 241 to be supplied to the shaft portion through the liquid introduction hole 245. This can inhibit liquid solidification. Although the liquid introduction hole 245 is formed in the shaft 27 as well in the example shown to facilitate understanding, the shaft 27 does not have to have the liquid introduction hole 245.

Figure 5C:
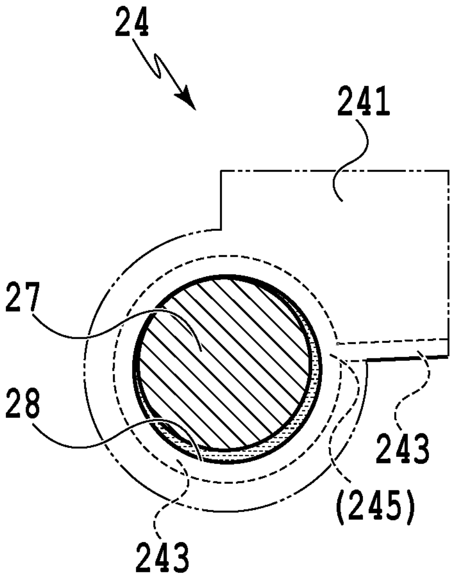
Figure 5D:
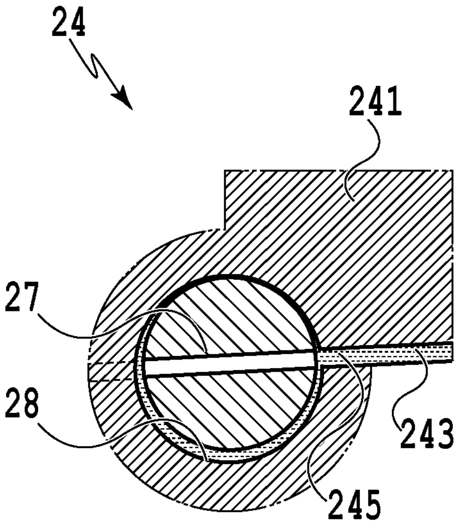

FIG. 5C is a schematic side view of the float portion 241 according to the present embodiment. As shown in FIG. 5C, the liquid holding portion 243 according to the present embodiment is formed from a side surface portion of the float portion 241 along the outer circumference of the insertion hole 28. This configuration allows ink supplied from the side surface portion of the float portion 241 to pool on the circumferential edge of the insertion hole 28 as well. Further, the ink pooling on the circumferential edge of the insertion hole 28 is more easily supplied to the shaft portion.

Liquid solidification can thus be inhibited. The liquid holding portion 243 according to the present embodiment is also formed along the circumferential edge of the insertion hole 28. The liquid introduction hole 245 may also be formed to communicate with the shaft portion from the bottom surface 244 of the float portion 241. Thus, the liquid ejection apparatus according to the present embodiment can detect a remaining amount of liquid while inhibiting liquid solidification.

Third Embodiment

Next, a liquid ejection apparatus of a third embodiment is described using FIGS. 6A to 6D. Note that, like the first embodiment, the printing apparatus 1 that performs printing by ejecting ink to the printing medium M is described as an example in the following description. Also, a configuration which is the same as or equivalent to that in the printing apparatus 1 of the first embodiment is denoted by the same reference numeral as that used in the first embodiment to omit its detail description where appropriate.

Figure 6A:
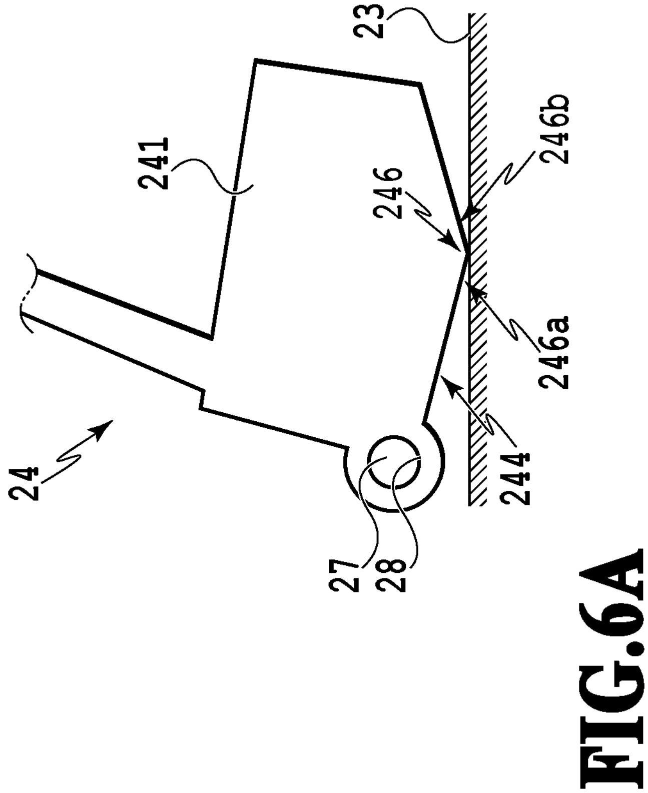
FIGS. 6A to 6D are schematic diagrams of the float portion.
Figure 6B:
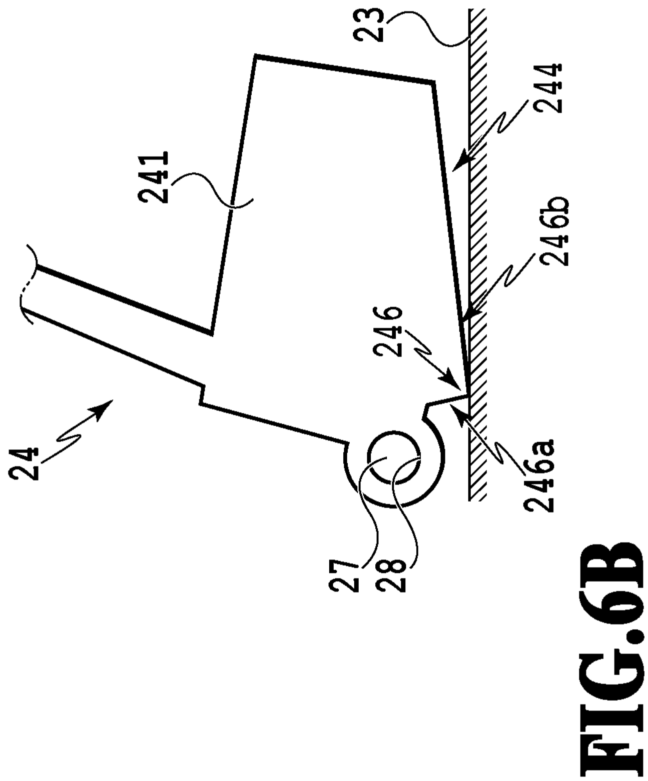
Figure 6C:
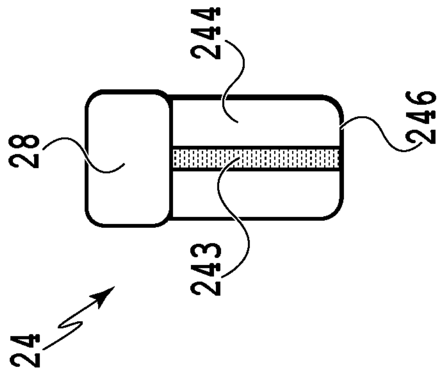

The present embodiment has an object to provide a liquid ejection apparatus that can inhibit liquid solidification more. FIGS. 6A to 6D are schematic diagrams of the float portion 241 according to the present embodiment. As shown in FIG. 6A, the bottom surface 244 of the float portion 241 is bent. The bent portion of the bottom surface 244 is hereinafter called a bent portion 246. In the present embodiment, the bent portion 246 contacts the bottom surface 23 in the retention chamber 21 as the ink in the retention chamber 21 shown in FIGS. 2A and 2B is consumed. Once the bent portion 246 contacts the bottom surface 23 in the retention chamber 21, a meniscus is formed in a first interstice 246*a* and a second interstice 246*b*. In other words, once the bent portion 246 contacts the bottom surface 23 in the retention chamber 21, ink pools in the first interstice 246*a* and the second interstice 246*b*. As shown in FIG. 6C, the liquid holding portion 243 is formed at the bottom surface 244 of the float portion 241 according to the present embodiment. Note that the liquid holding portion 243 according to the present embodiment may extend also at the second interstice 246*b* side of the bottom surface 244 although it is invisible in FIG. 6C. In a case where the liquid holding portion 243 is formed at the bottom surface 244 of the float portion 241, a less portion of the liquid holding portion 243 is exposed to the atmosphere. This can inhibit liquid retained by the liquid holding portion 243 from evaporating. Further, the liquid introduction hole 245 (see FIG. 5A) is formed in the bottom surface 244 of the float portion 241, and the first end side of the liquid holding portion 243 is in contact with the inner circumferential surface of the insertion hole 28.

This configuration allows ink pooling in the first interstice 246*a* and the second interstice 246*b* to be sucked up to the shaft portion through the liquid holding portion 243. The liquid ejection apparatus according to the present embodiment can thus detect a remaining amount of liquid while inhibiting liquid solidification.

Figure 6D:
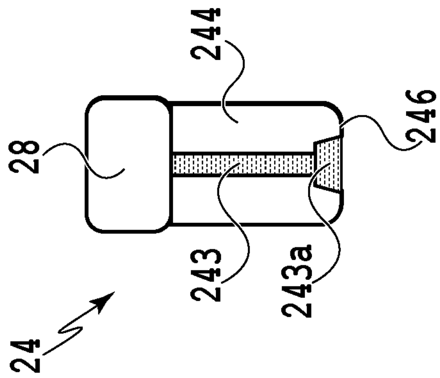

Next, a modification of the present embodiment is described. As shown in FIG. 6B, a distance from the bent portion 246 to the insertion hole 28 is preferably short. A short distance from the bent portion 246 to the insertion hole 28 makes it easier to supply liquid to between the outer peripheral surface of the shaft 27 and the inner circumferential surface of the insertion hole 28. Further, a close distance from the bent portion 246 to the insertion hole 28 makes the first interstice 246*a* (see FIG. 6B) narrow. Thus, ink pools more easily than in a case where the first interstice 246*a* is formed widely (see FIG. 6A). Also, as shown in FIG. 6D, the bent portion 246 preferably includes the expanded diameter portion 243*a*. In a case where the expanded diameter portion 243*a* is formed at the bent portion 246, the width is wider near the bent portion 246 than at the first end side of the liquid holding portion 243. Thus, more ink can pool than in a case where the expanded diameter portion 243*a* is not formed. For this reason, forming the expanded diameter portion 243*a* at the bent portion 246 allows more liquid to be supplied to the shaft portion.

The configuration thus described can detect a remaining amount of liquid while inhibiting liquid solidification. Note that the liquid holding portion 243 may be formed at a side surface portion of the float portion 241 in the present embodiment as well. In this case, liquid is sucked up also from the side surface of the float portion 241, which enables detection of a remaining amount of liquid while inhibiting liquid solidification even more.

Fourth Embodiment

Next, a liquid ejection apparatus of a fourth embodiment is described using FIGS. 7A to 7G. Note that, like the first embodiment, the printing apparatus 1 that performs printing by ejecting ink to the printing medium M is described as an example in the following description. Also, a configuration which is the same as or equivalent to that in the printing apparatus 1 of the first embodiment is denoted by the same reference numeral as that used in the first embodiment to omit its detail description where appropriate.

As described earlier, as liquid in the retention chamber 21 (see FIGS. 2A and 2B) is consumed, ink remains on the bottom surface 23 inside the retention chamber 21, scattered. Thus, the present embodiment aims to provide a liquid ejection apparatus that can inhibit liquid solidification more by sucking up liquid scattered on the bottom surface 23 in the retention chamber 21.

Figure 7B:
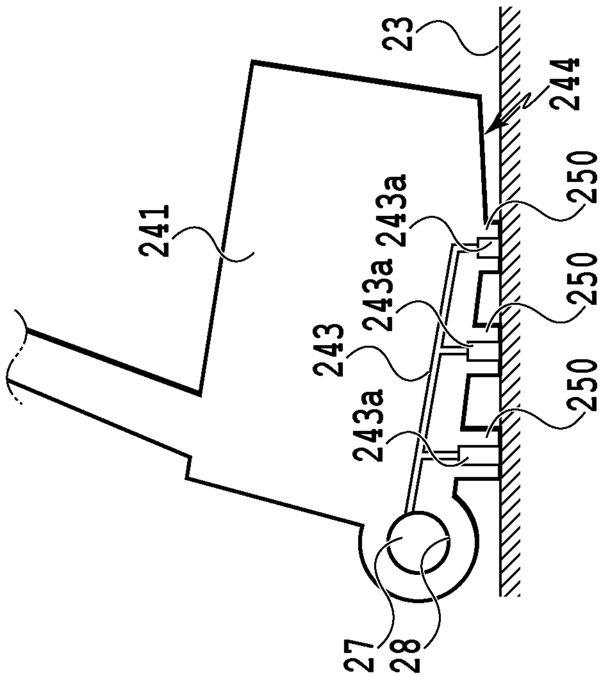
FIGS. 7A to 7G are schematic diagrams of the float portion.
Figure 7A:
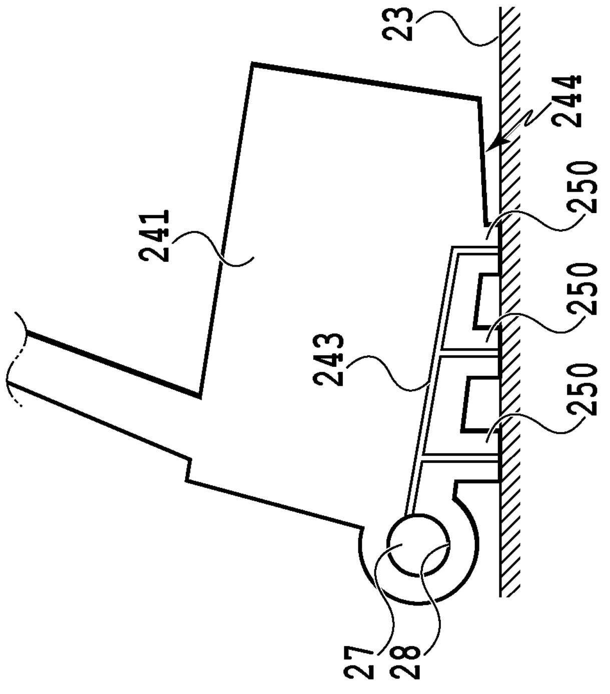

FIGS. 7A to 7G are schematic diagrams of the float portion 241 according to the present embodiment. As shown in FIG. 7A, at least one bump portion 250 is formed at the bottom surface 244 of the float portion 241 according to the present embodiment. Then, by forming the liquid holding portion 243 at the surface of each bump portion 250, ink scatted on the bottom surface 23 in the retention chamber 21 can be sucked up by capillary force through the liquid holding portion 243 extending at the surface of each bump portion 250. Ink sucked up by the liquid holding portion 243 formed at the surface of each bump portion 250 is supplied to the shaft portion through the liquid holding portion 243 formed at the side surface of the float portion 241. Also, with more liquid holding portions 243 formed at the surface of each bump portion 250, more ink can be supplied to the shaft portion. Further, as shown in FIG. 7B, the expanded diameter portion 243*a* is preferably formed in the present embodiment as well. This allows even stronger capillary force to be generated to suck up the ink.

Figure 7G:
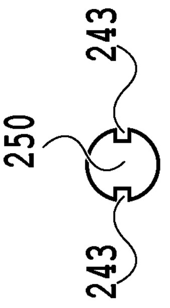
Figure 7F:
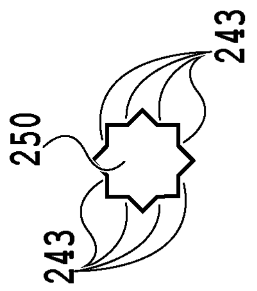
Figure 7E:
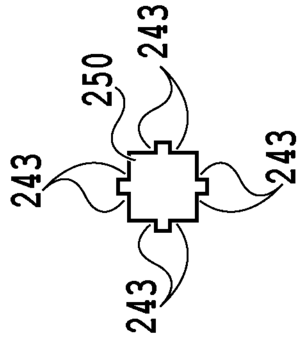
Figure 7D:
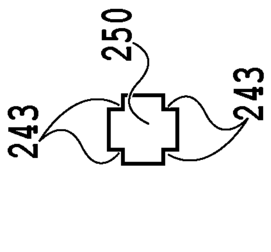
Figure 7C:
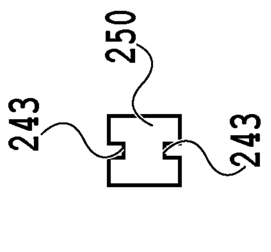

There is no limitation on the shape of the bump portion 250 as long as the bump portion 250 can suck up ink. For example, as shown in FIG. 7C, the liquid holding portions 243 may be formed so that the bump portion 250 may form the letter "H" in a bottom view. Although the liquid holding portions 243 are formed to extend vertically in FIG. 7A in the example shown, the liquid holding portions 243 may be formed to extend laterally in FIG. 7A. In another example, as shown in FIG. 7D, the liquid holding portions 243 may be formed so that the bump portion 250 may form a "cross" in a bottom view. In yet another example, as shown in FIG. 7E, the liquid holding portions 243 may be formed so that each surface of the bump portion 250 which is a polygonal prism (a square prism in the example shown) in shape may include a protruding portion. In still another example, as shown in FIG. 7F, the liquid holding portions 243 may be formed so that the bump portion 250 may be jaggy in a bottom view. In still another example, as shown in FIG. 7G, the liquid holding portions 243 may be formed in the surface of the solid-cylindrical bump portion 250.

The liquid ejection apparatus according to the present embodiment can detect a remaining amount of liquid while inhibiting liquid solidification by sucking up liquid scattered on the bottom surface 23 in the retention chamber 21.

Fifth Embodiment

Figure 8A:
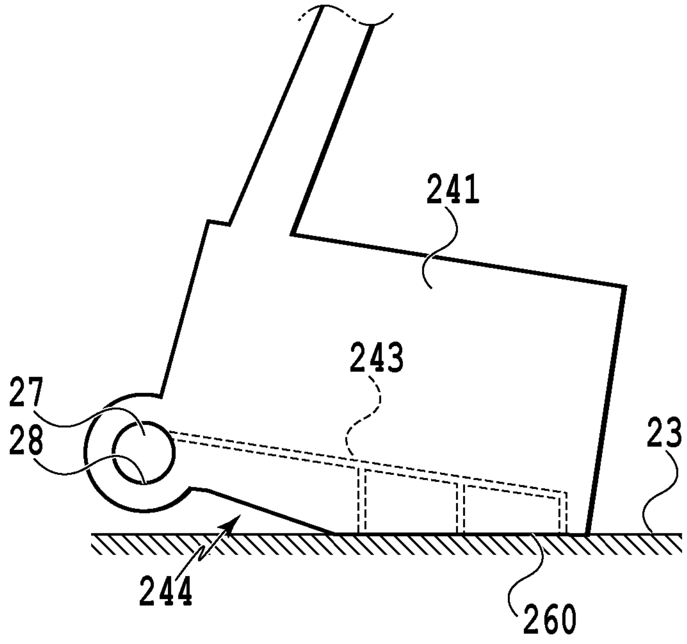
FIGS. 8A to 8C are schematic diagrams of the float portion.
Figure 8B:
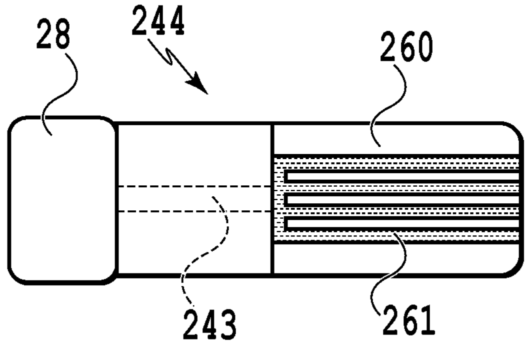
Figure 8C:
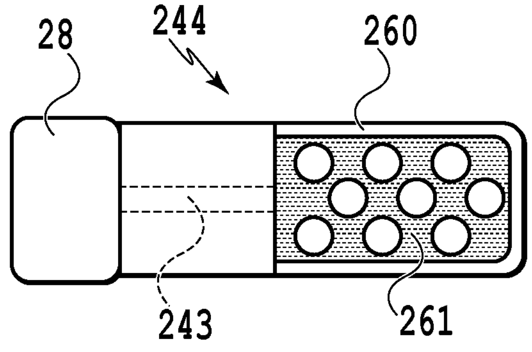

Next, a liquid ejection apparatus of a fifth embodiment is described using FIGS. 8A to 8C. Note that, like the first embodiment, the printing apparatus 1 that performs printing by ejecting ink to the printing medium M is described as an example in the following description. Also, a configuration which is the same as or equivalent to that in the printing apparatus 1 of the first embodiment is denoted by the same reference numeral as that used in the first embodiment to omit its detail description where appropriate.

The present embodiment has an object to provide a liquid ejection apparatus that can inhibit liquid solidification more. FIGS. 8A to 8C are schematic diagrams of the float portion 241 according to the present embodiment. FIG. 8A is a schematic side view of the float portion 241 according to the present embodiment. FIG. 8B is a schematic bottom view of the float portion 241 according to the present embodiment. FIG. 8C is a schematic bottom view showing a modification of the present embodiment. As shown in FIG. 8A, the bottom surface 244 of the float portion 241 according to the present embodiment is bent. The bottom surface 244 of the float portion 241 includes a contacting surface 260 that contacts the bottom surface 23 of the retention chamber 21 (see FIGS. 2A and 2B) and a non-contacting surface that does not contact the bottom surface 23 of the retention chamber 21 (see FIGS. 2A and 2B). As shown in FIG. 8B, a bumpy portion 261 is formed at the contacting surface 260. For example, a plurality of slits are formed at the bumpy portion 261. Then, the liquid holding portion 243 is formed inside the float portion 241, extending from the bumpy portion 261 to the shaft portion to allow them to communicate with each other.

This configuration can supply liquid from the bumpy portion 261 formed at the contacting surface 260 to between the outer peripheral surface of the shaft 27 and the inner circumferential surface of the insertion hole 28. Liquid solidification can thus be inhibited.

Further, liquid retained in the bumpy portion 261 forms meniscuses between the bumpy portion 261 and the bottom surface 23 of the retention chamber 21, and the float portion 241 is fixed and kept from turning. Thus, erroneous detection of a remaining amount of liquid can be reduced.

Next, a modification of the present embodiment is described. As shown in FIG. 8C, the bumpy portion 261 may include a single recessed portion and a plurality of projecting portions scattered in the recessed portion. This configuration also allows liquid to be supplied from the bumpy portion 261 formed at the contacting surface 260 to between the outer peripheral surface of the shaft 27 and the inner circumferential surface of the insertion hole 28. Liquid solidification can thus be inhibited. Note that the recessed-type liquid holding portion 243 may be formed at least one of the side surface and the non-contacting surface of the float portion 241 according to the present embodiment. This configuration allows liquid to be retained more, thereby enabling liquid solidification to be inhibited more.

Sixth Embodiment

Next, a liquid ejection apparatus of a sixth embodiment is described using FIGS. 9A to 9F. Note that, like the first embodiment, the printing apparatus 1 that performs printing by ejecting ink to the printing medium M is described as an example in the following description. Also, a configuration which is the same as or equivalent to that in the printing apparatus of the first embodiment is denoted by the same reference numeral as that used in the first embodiment to omit its detail description where appropriate.

Figure 9A:
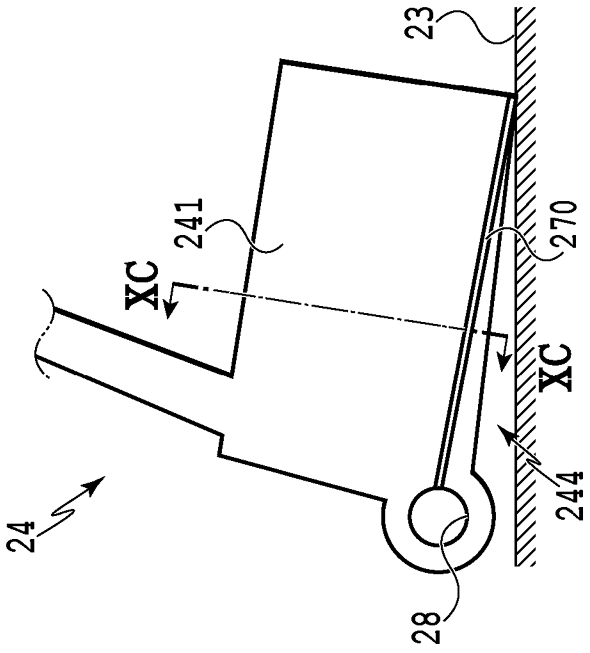
FIGS. 9A to 9F are schematic diagrams of the turning member.
Figure 9B:
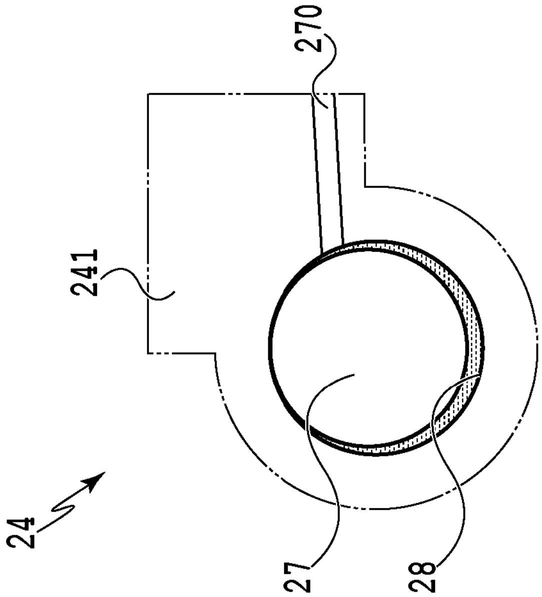

The present embodiment has an object to provide a liquid ejection apparatus that can inhibit liquid solidification more. FIGS. 9A to 9F are schematic diagrams of the turning member 24 according to the present embodiment. FIG. 9A is a schematic side view of the turning member 24 according to the present embodiment. FIG. 9B is a schematic side view of the vicinity of the shaft portion according to the present embodiment. In the present embodiment, the liquid holding portions 243 are formed by minute protrusion portions 270 provided at side surfaces of the float portion 241. This configuration, like the first embodiment, allows liquid to be supplied to between the outer peripheral surface of the shaft 27 and the inner circumferential surface of the insertion hole 28 through the liquid holding portions 243 (the minute protrusion portions 270).

Figure 9C:
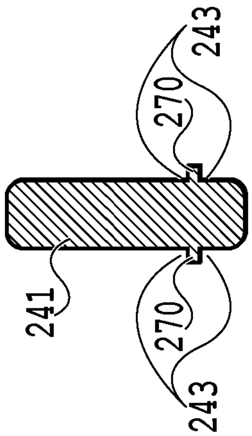
Figure 9D:
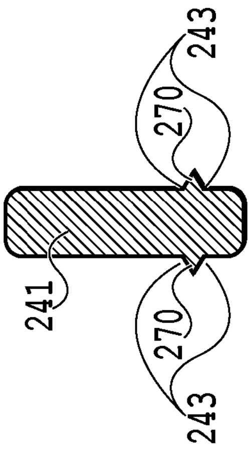
Figure 9E:
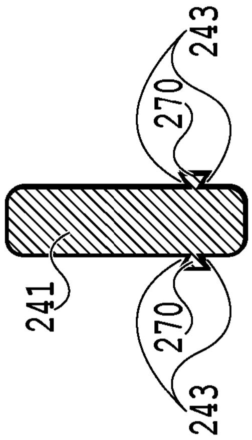
Figure 9F:
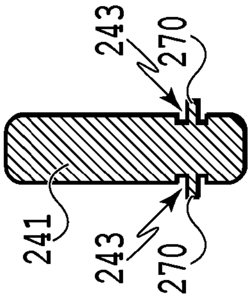

FIGS. 9C to 9F are sectional view taken along the line Xc-Xc in FIG. 9A. There is no limitation on the shape of the minute protrusion portion 270 as long as the minute protrusion portion 270 allows ink to be sucked up using capillary force. For example, as shown in FIG. 9C, the minute protrusion portion 270 may have a shape such that its width does not change as the minute protrusion portion 270 extends away from the float portion 241. In another example, as shown in FIG. 9D, the minute protrusion portion 270 may have a shape such that its diameter decreases as the minute protrusion portion 270 extends away from the float portion 241. In yet another example, as shown in FIG. 9E, the minute protrusion portion 270 may have a shape such that its diameter increases as the minute protrusion portion 270 extends away from the float portion 241. In still another example, as shown in FIG. 9F, the minute protrusion portion 270 may be formed at a recessed liquid holding portion 243. The shape in FIG. 9F in particular can increase the liquid retaining power more. The liquid ejection apparatus of the present embodiment can detect a remaining amount of liquid while inhibiting liquid solidification more.

Seventh Embodiment

Next, a liquid ejection apparatus of a seventh embodiment is described using FIGS. 10A to 10E. Note that, like the first embodiment, the printing apparatus 1 that performs printing by ejecting ink to the printing medium M is described as an example in the following description. Also, a configuration which is the same as or equivalent to that in the printing apparatus 1 of the first embodiment is denoted by the same reference numeral as that used in the first embodiment to omit its detail description where appropriate.

Figure 10A:
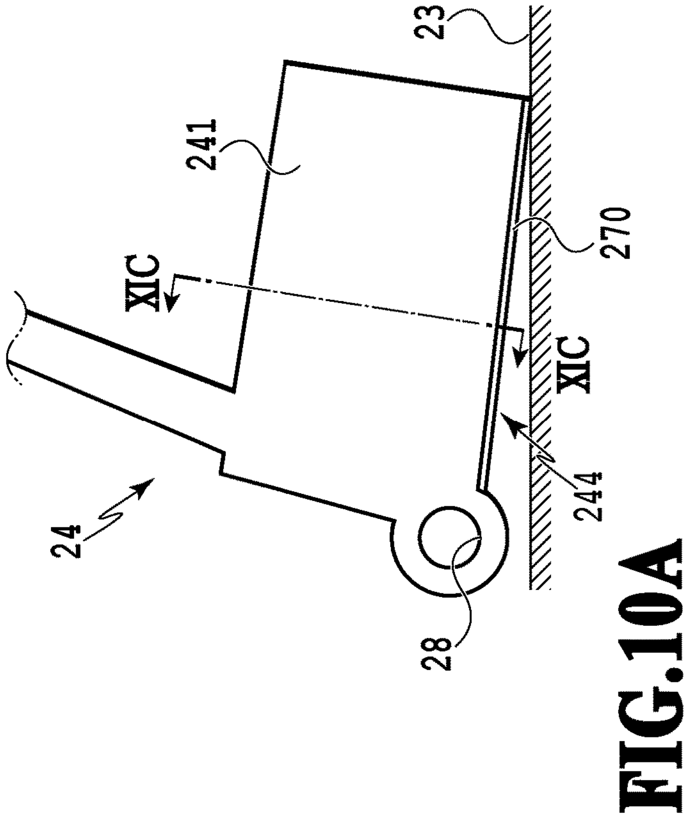
FIGS. 10A to 10E are schematic diagrams of the turning member.
Figure 10B:
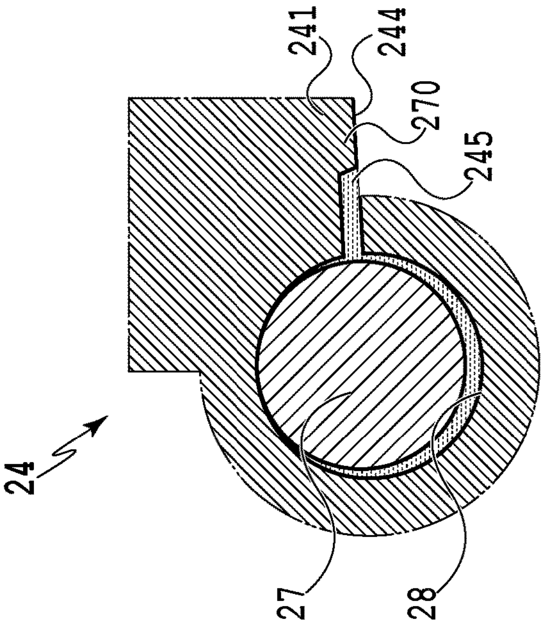

The present embodiment has an object to provide a liquid ejection apparatus that can inhibit liquid solidification more. FIGS. 10A to 10E are schematic diagrams of the turning member 24 according to the present embodiment. FIG. 10A is a schematic side view of the turning member 24 according to the present embodiment. FIG. 10B is a schematic sectional view of the float portion 241 and the shaft 27 according to the present embodiment. As shown in FIG. 10A, in the present embodiment, the minute protrusion portion 270 is formed at the bottom surface 244 of the float portion 241. Thus, liquid pools at both sides of the minute protrusion portion 270, and both sides of the minute protrusion portion 270 serve as the liquid holding portion 243. Also, as shown in FIG. 10B, the liquid introduction hole 245 is formed at the bottom surface 244 of the float portion 241 to introduce liquid to between the outer peripheral surface of the shaft 27 and the inner circumferential surface of the insertion hole 28.

This configuration allows liquid sucked up through the minute protrusion portion 270 to be supplied from the liquid introduction hole 245 to the shaft portion. It goes without saying that one end of the minute protrusion portion 270 may be routed along the outer circumference of the insertion hole 28 and be in contact with the inner circumferential surface of the insertion hole 28. This configuration makes it easier to supply liquid into between the outer peripheral surface of the shaft 27 and the inner circumferential surface of the insertion hole 28 than in a case where the liquid holding portion 243 is formed at the side surface of the float portion 241.

Figure 10C:
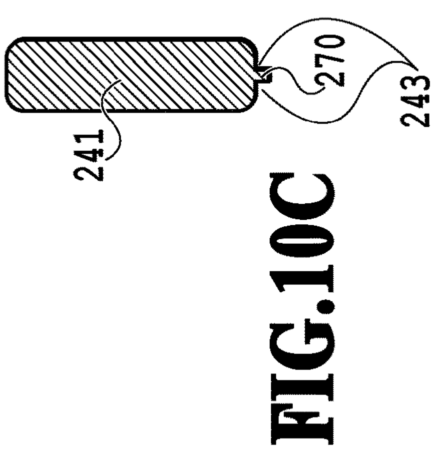
Figure 10D:
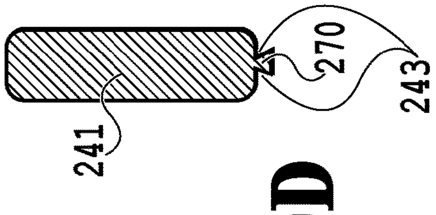
Figure 10E:
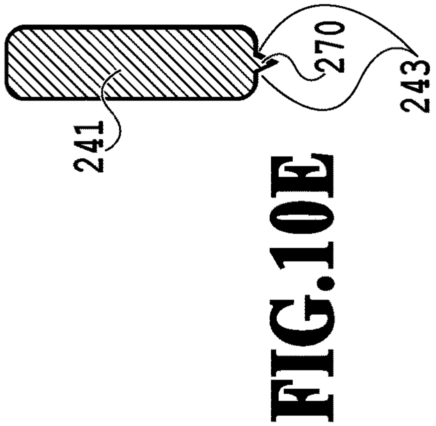

FIGS. 10C to 10E are sectional views taken along the line XIc-XIc in FIG. 10A. There is no particular limitation on the shape of the minute protrusion portion 270 as long as the minute protrusion portion 270 can suck up liquid using capillary force. For example, as shown in FIG. 10C, the minute protrusion portion 270 may have a shape such that its width does not change as the minute protrusion portion 270 extends downward from the bottom surface 244 of the float portion 241. In another example, as shown in FIG. 10D, the minute protrusion portion 270 may have a shape such that its width decreases in diameter as the minute protrusion portion 270 extends downward from the bottom surface 244 of the float portion 241. In yet another example, as shown in FIG. 10E, the minute protrusion portion 270 may have a shape such that its width increases in diameter as the minute protrusion portion 270 extends downward from the bottom surface 244 of the float portion 241. The liquid ejection apparatus according to the present embodiment can detect a remaining amount of liquid while inhibiting liquid solidification more. Note that the minute protrusion portion 270 may be formed at the side surface of the float portion 241 according to the present embodiment. This configuration can detect a remaining amount of liquid while inhibiting liquid solidification even more.

Eighth Embodiment

Figure 11:
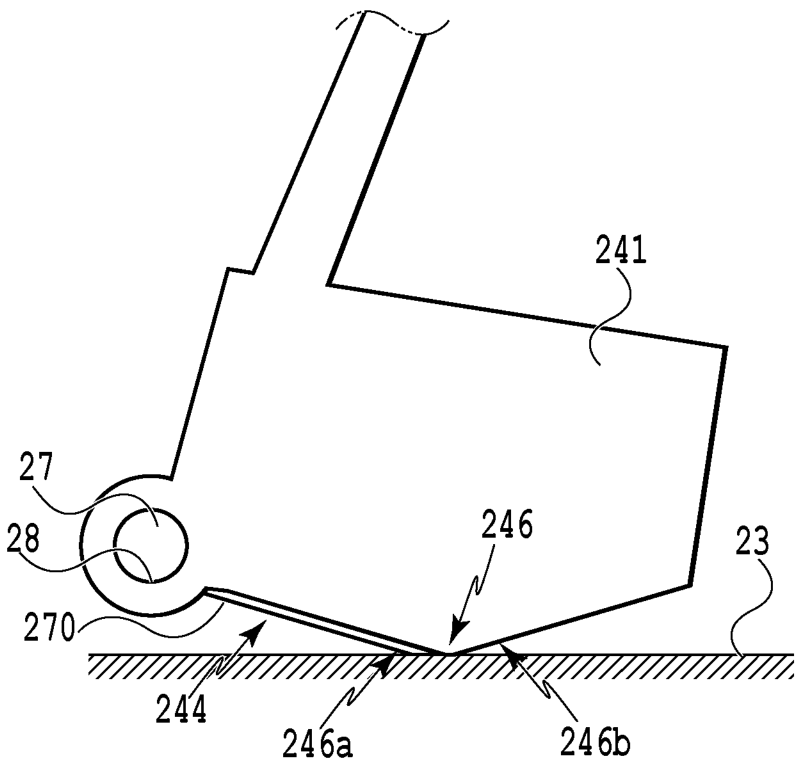
FIG. 11 is a schematic side view of the float portion.

Next, a liquid ejection apparatus of an eighth embodiment is described using FIG. 11. Note that, like the first embodiment, the printing apparatus 1 that performs printing by ejecting ink to the printing medium M is described as an example in the following description. Also, a configuration which is the same as or equivalent to that in the printing apparatus 1 of the third embodiment is denoted by the same reference numeral as that used in the third embodiment to omit its detail description where appropriate.

The present embodiment has an object to provide a liquid ejection apparatus that can inhibit liquid solidification more. FIG. 11 is a schematic side view of the float portion 241 according to the present embodiment. In the present embodiment, the bent portion 246 is provided at the bottom surface 244 of the float portion 241. In the present embodiment, the minute protrusion portion 270 is formed to extend from the bent portion 246 to the insertion hole 28. Further, the liquid introduction hole 245 (see FIG. 10B) is formed at the bottom surface 244 of the float portion 241.

This configuration enables liquid to be supplied to the shaft portion even in a case where the liquid holding portion 243 is formed to extend only from the bent portion 246 to the insertion hole 28. Note that in the present embodiment, the liquid introduction hole 245 may be omitted, and the minute protrusion portion 270 may be formed in such a manner as to be routed onto the circumferential edge (i.e., the side surface of the float portion 241) and be in contact with the inner circumferential surface of the insertion hole 28. It goes without saying that an additional minute protrusion portion 270 may be formed at the side surface of the float portion 241.

Ninth Embodiment

Figure 12:
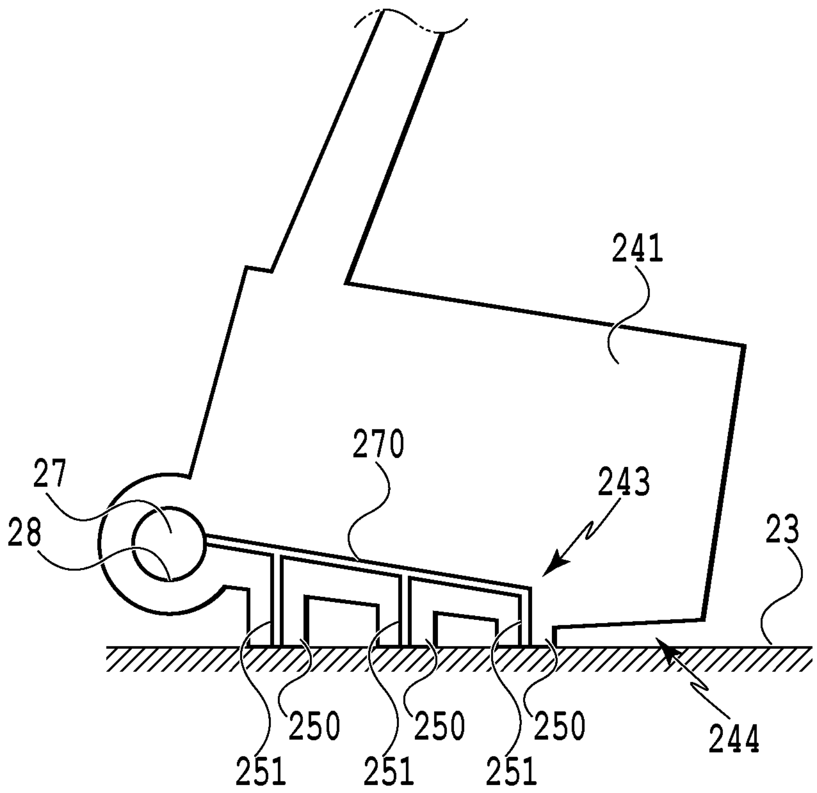
FIG. 12 is a schematic side view of the float portion.

Next, a liquid ejection apparatus of a ninth embodiment is described using FIG. 12. Note that, like the first embodiment, the printing apparatus 1 that performs printing by ejecting ink to the printing medium M is described as an example in the following description. Also, a configuration which is the same as or equivalent to that in the printing apparatus 1 of the fourth embodiment is denoted by the same reference numeral as that used in the fourth embodiment to omit its detail description where appropriate.

As described earlier, as liquid in the retention chamber 21 (see FIGS. 2A and 2B) is consumed, ink remains on the bottom surface 23 inside the retention chamber 21, scattered. Thus, the present embodiment aims to provide a liquid ejection apparatus that can inhibit liquid solidification more by sucking up liquid scattered on the bottom surface 23 in the retention chamber 21. FIG. 12 is a schematic side view of the float portion 241 according to the present embodiment. In the present embodiment, at least one bump portion 250 is formed at the bottom surface 244 of the float portion 241. A groove portion 251 is formed at the surface of each bump portion 250, extending vertically. Then, at the side surface of the float portion 241, the minute protrusion portion 270 extends in such a manner as to intersect with the groove portions 251. As shown, a first end side of the minute protrusion portion 270 is in contact with the inner circumferential surface of the insertion hole 28. In other words, the liquid holding portion 243 according to the present embodiment is a configuration such that the groove portions 251 and the minute protrusion portion 270 are formed in such a manner as to be continuous with each other.

This configuration can suck up liquid scattered on the bottom surface 23 in the retention chamber 21 using the groove portions 251 and supply liquid to the shaft portion through the minute protrusion portion 270. The liquid ejection apparatus according to the present embodiment can detect a remaining amount of liquid while inhibiting liquid solidification more.

Tenth Embodiment

Figure 13:
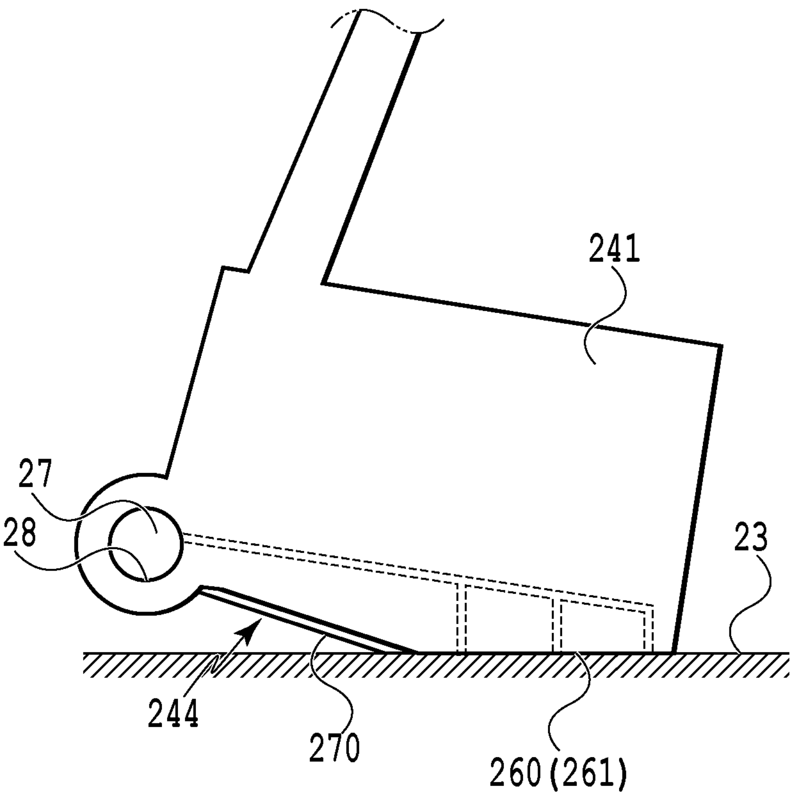
FIG. 13 is a schematic side view of the float portion.

Next, a liquid ejection apparatus of a tenth embodiment is described using FIG. 13. Note that, like the first embodiment, the printing apparatus 1 that performs printing by ejecting ink to the printing medium M is described as an example in the following description. Also, a configuration which is the same as or equivalent to that in the printing apparatus 1 of the fifth embodiment is denoted by the same reference numeral as that used in the fifth embodiment to omit its detail description where appropriate.

The present embodiment has an object to provide a liquid ejection apparatus that can inhibit liquid solidification more. FIG. 13 is a schematic side view of the float portion 241 according to the present embodiment. As shown in FIG. 13, the bottom surface 244 of the float portion 241 according to the present embodiment is bent. The bottom surface 244 of the float portion 241 includes the contacting surface 260 that contacts the bottom surface 23 of the retention chamber 21 (see FIGS. 2A and 2B) and the non-contacting surface that does not contact the bottom surface 23 of the retention chamber 21 (see FIGS. 2A and 2B). The bumpy portion 261 (see FIG. 8B or 8C) is formed at the contacting surface 260.

The liquid holding portion 243 is formed inside the float portion 241, extending from the bumpy portion 261 to the shaft portion to allow them to communicate with each other. Further, the minute protrusion portion 270 is formed at the non-contacting surface of the bottom surface 244.

This configuration allows liquid to be supplied from the bumpy portion 261 formed at the contacting surface 260 and the minute protrusion portion 270 formed at the non-contacting surface to between the outer peripheral surface of the shaft 27 and the inner circumferential surface of the insertion hole 28. Liquid solidification can thus be inhibited more. Note that at least one of the recessed liquid holding portion 243 and the minute protrusion portion 270 may be formed at the side surface of the float portion 241 according to the present embodiment.

Summary of First to Tenth Embodiments

As described earlier, the liquid holding portion 243 has at least one of a projecting shape and a recessed shape. In a case where the liquid holding portion 243 has at least one of a projecting shape and a recessed shape, liquid can be supplied to between the outer peripheral surface of the shaft 27 and the inner circumferential surface of the insertion hole 28 using capillary force even after ink is consumed to the point where the height L of the liquid surface (see FIG. 2B) reaches a position lower than the shaft 27. Thus, any of the configurations of the first to tenth embodiments can maintain a state where the turning member 24 can turn smoothly about the shaft 27.

Thus, even in a case where a small amount of liquid remains, any of the configurations of the first to tenth embodiments can continue detecting a remaining amount of liquid while inhibiting liquid solidification. As a result, the control unit of the printing apparatus 1 can inform a user at an appropriate timing that the ink housing body 30 needs to be replaced. Thus, a user can check the notification displayed on the display unit 14 and replace the ink housing body 30 at an appropriate timing.

Other Embodiments

The configuration of the liquid holding portion 243 is not limited to the configurations exemplified. The configuration of the liquid holding portion 243 may be any configuration as long as the liquid holding portion 243 can suck up ink using capillary force and supply the liquid to the shaft portion.

Liquid retained in the retention chamber 21 according to the present disclosure is not limited to ink. For example, a remaining amount of, e.g., a pretreatment liquid ejected to the printing medium M before ink during printing may be detected based on the technique according to the present disclosure.

Although the shaft 27 and the float portion 241 are separate members in the first embodiment, the shaft 27 and the float portion 241 may be integrally formed. In this case, the liquid holding portion 243 may be formed continuously from the float portion 241 to the surface of the shaft 27, so that liquid is supplied to the interstices between the shaft 27 and the hole portions 25*a* of the support members 25. A remaining amount of liquid can thus be detected while liquid solidification is inhibited.

Although a material having a lower specific gravity than the liquid is used for the float portion 241 in the first embodiment. However, a material having a larger specific gravity than liquid may be used as a material for the float portion 241 as long as the float portion 241 has a hollow structure so that the float portion 241 as a whole has a lower specific gravity than liquid. In other words, the shape of the float portion 241 may be a float bag.

A plurality of the liquid holding portions 243 are preferably formed. Forming a plurality of liquid holding portions 243 can increase the capillary force even more. For example, in an example where a plurality of liquid holding portions 243 are formed at the side surface of the float portion 241, bubbles on the liquid surface of ink, if any, can be broken more easily. The float portion 241 can thus turn smoothly.

Even in a case where a small amount of liquid remains, the liquid ejection apparatus according to the present disclosure can continue liquid ejection while inhibiting liquid solidification.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-162737, filed Oct. 1, 2021 which are hereby incorporated by reference wherein in its entirety.

What is claimed is:

1. A liquid ejection apparatus comprising:
- a retention chamber configured to retain liquid;
- a turning member located in the retention chamber and configured to turn about a shaft portion in accordance with a height of a liquid surface of the liquid retained in the retention chamber; and
- a sensor unit configured to detect turning of the turning member, wherein
- the turning member includes
  - a float portion having a lower specific gravity than the liquid retained in the retention chamber and
  - a detected portion located above the float portion and detected by the sensor unit, and
  - a liquid holding portion formed to extend to the shaft portion from at least one of a side surface portion and a bottom surface portion of the float portion and configured to be capable of holding the liquid retained in the retention chamber, and
    - in a case where the liquid surface of the liquid retained in the retention chamber is at or below a predetermined height, the liquid holding portion touches the liquid surface of the liquid retained in the retention chamber to maintain the height of the liquid surface near the shaft portion to a height where the shaft portion is located.

2. The liquid ejection apparatus according to claim 1, wherein
- the liquid holding portion touches the liquid surface of the liquid retained in the retention chamber in a case where the liquid surface of the liquid retained in the retention chamber is located at a position lower than the shaft portion.

3. The liquid ejection apparatus according to claim 1, wherein
- the liquid holding portion sucks up the liquid using capillary force.

4. The liquid ejection apparatus according to claim 1, wherein
- the turning member includes an insertion hole, wherein a shaft configured to turn the float portion is inserted in the insertion hole, a first end of the liquid holding portion is in contact with an inner circumferential surface of the insertion hole, a second end of the liquid holding portion is in contact with the bottom surface portion of the float portion, and the liquid holding portion is formed continuously from the bottom surface portion of the float portion to the inner circumferential surface of the insertion hole.

5. The liquid ejection apparatus according to claim 4, wherein a liquid introduction hole is formed at the float portion to introduce the liquid to the shaft portion.

6. The liquid ejection apparatus according to claim 1, wherein a second end side of the liquid holding portion is wider in width than a first end side of the liquid holding portion.

7. The liquid ejection apparatus according to claim 1, wherein the liquid holding portion has at least one of a projecting shape and a recessed shape.

8. The liquid ejection apparatus according to claim 1, wherein a plurality of the liquid holding portions are formed.

9. The liquid ejection apparatus according to claim 1, wherein in a case where the height of the liquid surface of the liquid retained in the retention chamber is at or below the predetermined height, the bottom surface portion of the float portion contacts a bottom surface portion of the retention chamber, and the liquid holding portion is formed at the bottom surface portion of the float portion.

10. The liquid ejection apparatus according to claim 9, wherein the bottom surface portion of the float portion includes a bent portion which is bent, and in a case where the height of the liquid surface of the liquid retained in the retention chamber is at or below the predetermined height, the bent portion contacts the bottom surface portion of the retention chamber.

11. The liquid ejection apparatus according to claim 10, wherein at least one bump portion is formed at the bottom surface portion of the float portion, a recessed portion is formed at a surface of the bump portion, and in a case where the height of the liquid surface of the liquid retained in the retention chamber is at or below the predetermined height, the bump portion contacts the bottom surface portion of the retention chamber and sucks up the liquid through the recessed portion.

12. The liquid ejection apparatus according to claim 9, wherein a bumpy portion is formed at a contacting surface of the bottom surface portion of the float portion, the contacting surface contacting the bottom surface portion of the retention chamber.

* * * * *